US012466699B2

(12) United States Patent
Cullen

(10) Patent No.: US 12,466,699 B2
(45) Date of Patent: Nov. 11, 2025

(54) PERFORATING CLAMSHELL BUCKET SYSTEM

(71) Applicant: SRC INNOVATIONS, LLC, Chinook, WA (US)

(72) Inventor: Steven R. Cullen, Chinook, WA (US)

(73) Assignee: SRC INNOVATIONS, LLC, Chinook, WA (US)

( * ) Notice: Subject to any disclaimer, the term of this patent is extended or adjusted under 35 U.S.C. 154(b) by 0 days.

(21) Appl. No.: 18/661,131

(22) Filed: May 10, 2024

(65) Prior Publication Data

US 2024/0294362 A1 Sep. 5, 2024

Related U.S. Application Data

(63) Continuation of application No. 17/272,057, filed as application No. PCT/US2019/049063 on Aug. 30, 2019, now Pat. No. 12,103,827.

(Continued)

(51) Int. Cl.
*B66C 3/02* (2006.01)
*B66C 3/16* (2006.01)

(Continued)

(52) U.S. Cl.
CPC .................. *B66C 3/02* (2013.01); *B66C 3/16* (2013.01); *B66C 13/16* (2013.01); *B66C 13/20* (2013.01);

(Continued)

(58) Field of Classification Search
CPC ...... B66C 3/02; B66C 3/16; E02F 3/40; E02F 3/404; E02F 3/413; E02F 3/60
See application file for complete search history.

(56) References Cited

U.S. PATENT DOCUMENTS

| | | | |
|---|---|---|---|
| 116,282 | A | 6/1871 | Ebbert |
| 122,227 | A | 12/1871 | Colton |

(Continued)

FOREIGN PATENT DOCUMENTS

| | | | |
|---|---|---|---|
| EP | 2484837 | A1 | 8/2012 |
| EP | 2484837 | B1 | 6/2018 |
| WO | 2020047409 | A1 | 3/2020 |

OTHER PUBLICATIONS

Yohn et al., "Using Hydraulics as a Scale on the Farm," publication of the Extension Service of West Virginia University, (Year: 2007).

(Continued)

*Primary Examiner* — Christopher J Sebesta
*Assistant Examiner* — Audrey L Lusk
(74) *Attorney, Agent, or Firm* — Ryan L. Marshall; Jessica Kiser; Barnes & Thornburg LLP

(57) ABSTRACT

A clamp assembly comprising a pair of clamps may couple to an assembly body. The clamps may pivot to receive material beneath the assembly body. The clamps may include opposing surfaces that define a scoop space beneath the assembly body. Each of the clamps may include a cutting plate. The cutting plate may include a perforating edge configured to extend into the scoop space relative to a corresponding one of the opposing surfaces. The clamp may further include a retention plate. The retention plate may include an inner surface that faces the cutting plate. The cutting plate and the retention plate further define the scoop space between the clamps. The clamp assembly may couple to a lift assembly. The lift assembly may include a hydraulic actuator configured to raise and lower the clamp assembly.

20 Claims, 9 Drawing Sheets

Related U.S. Application Data

(60) Provisional application No. 62/725,039, filed on Aug. 30, 2018.

(51) Int. Cl.

| | |
|---|---|
| ***B66C 13/16*** | (2006.01) |
| ***B66C 13/20*** | (2006.01) |
| ***E02F 3/40*** | (2006.01) |
| ***E02F 3/60*** | (2006.01) |

(52) U.S. Cl.
CPC ................ *E02F 3/40* (2013.01); *E02F 3/404* (2013.01); *E02F 3/60* (2013.01)

(56) References Cited

U.S. PATENT DOCUMENTS

| | | | | | |
|---|---|---|---|---|---|
| 243,449 | A | * | 6/1881 | Imhorst | B66C 3/16 294/68.23 |
| 827,635 | A | * | 7/1906 | Hone | B66C 3/16 37/187 |
| 2,007,704 | A | | 7/1935 | Botten | |
| 2,061,585 | A | | 11/1936 | Meyer | |
| 2,890,806 | A | * | 6/1959 | Pilch | E02F 3/40 294/68.23 |
| 3,403,940 | A | * | 10/1968 | Clark | E02F 3/963 414/724 |
| 3,641,689 | A | * | 2/1972 | Billings | B66C 3/16 37/186 |
| 3,877,743 | A | * | 4/1975 | Johnson | B66C 3/16 414/735 |
| 4,012,069 | A | * | 3/1977 | Carson | B66C 3/16 294/68.23 |
| 4,493,605 | A | | 1/1985 | Cullen | |
| 5,836,089 | A | * | 11/1998 | Lipsker | E02F 9/2275 299/11 |
| 6,446,364 | B1 | | 9/2002 | Herrero Codina | |
| 6,653,804 | B1 | | 11/2003 | Kureck | |
| 2003/0019131 | A1 | | 1/2003 | Anderson | |
| 2018/0339887 | A1 | | 11/2018 | Bergeron | |
| 2019/0316318 | A1 | | 10/2019 | Cantu et al. | |
| 2021/0323794 | A1 | | 10/2021 | Cullen | |

OTHER PUBLICATIONS

Non-Final Office Action for U.S. Appl. No. 17/272,057, dated Aug. 30, 2023, 25 pages.
Final Office Action for U.S. Appl. No. 17/272,057, dated Mar. 20, 2024, 20 pages.
Notice of Allowance for U.S. Appl. No. 17/272,057, dated Jun. 4, 2024, 5 pages.

* cited by examiner

PERFORATING CLAMSHELL BUCKET SYSTEM

CROSS REFERENCE TO RELATED APPLICATIONS

This application is a Continuation of application Ser. No. 17/272,057, filed Feb. 26, 2021, which is a National Stage application of International Application No. PCT/US2019/049063, filed Aug. 30, 2019, which claims the benefit of U.S. Provisional Application No. 62/725,039, filed Aug. 30, 2018, herein incorporated by reference in their entirety.

TECHNICAL FIELD

This disclosure relates to hauling equipment and, in particular, to clamshell bucket hauling equipment.

BACKGROUND

Stored material, such as silo bags and/or feedstuff, may be arranged in elongated horizontal piles for loading and unloading. The material may be surrounded with packaging, such as a bag or casing. Loading equipment, such as front loading farm tractors, skid steer loaders and wheel loaders, may access the material from one direction, which may rip the packaging for scooping access. Ground surface and/or ripped remnants of the packaging may be scooped with the material cause impurities in the loaded material. Present approaches to material loading with traditional loading equipment may suffer from a variety of additional or alternative drawbacks, limitations, disadvantages and inefficiencies.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Stored material, such as silo bags and/or feedstuff, may be arranged in elongated horizontal piles for loading and unloading. The material may be surrounded with packaging, such as a bag or casing. Traditional loading equipment, such as front loading farm tractors, skid steer loaders and wheel loaders, may access the material from one direction. The traditional loading equipment may rip the packaging for scooping access. Material that is densely packaged within the packaging may expand and/or spill causing less efficient loads and/or spillage waste. Alternatively or in addition, the traditional loading equipment may access the material from one direction, resulting in wear and tear on the loading equipment as the material is pushed and re-packed into the scooping bucket. In some circumstances, operation of the traditional loading equipment to scoop the stored material may scuff or damage ground surface beneath or surrounding the load material. Ground surface and/or ripped remnants of the packaging may be scooped with the material may cause impurities in the material. In other circumstances, scuffing the ground may cause wear and tear. Traditional approaches to loading material may include additional or alternative drawbacks, limitations, disadvantages, and/or inefficiencies. Accordingly, there is a need for the systems and methods described herein.

By way of an introductory example, a clamshell bucket system is provided. A clamp assembly comprising a pair of clamps may couple to an assembly body. The clamps may pivot to receive material beneath the assembly body. The clamps may include opposing surfaces disposed between a first side and a second side of the clamp assembly. The clamps may pivot away from each other to expand a scoop space defined between the opposing surfaces and toward each other to contract the scoop space.

Each of the clamps may include a cutting plate positioned at the first side of the clamp assembly. The cutting plate may include a perforating edge configured to extend into the scoop space relative to a corresponding one of the opposing surfaces. The clamp may further include a retention plate positioned at second side of the clamp assembly. The retention plate may include an inner surface that faces the cutting plate. The cutting plate and the retention plate further define the scoop space between the clamps.

The clamp assembly may detachably couple to the lift assembly. The lift assembly may include a hydraulic actuator configured to raise and lower the clamp assembly.

Figure 1:
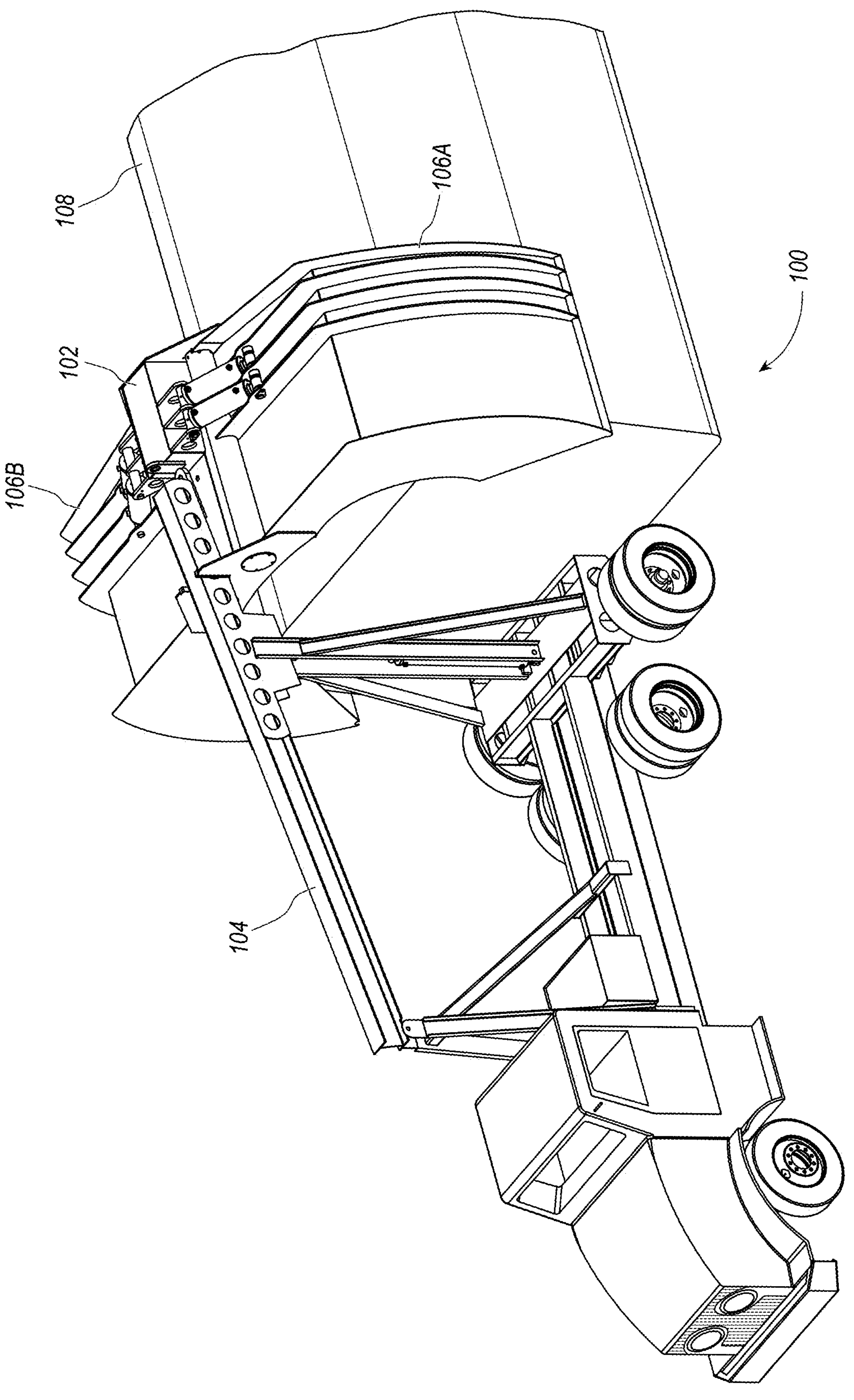
FIG. 1 illustrates a first example of a clamshell bucket system.

FIG. 1 illustrates a first example of a clamshell bucket system 100. System 100 may include a clamp assembly 102 and a lift assembly 104. The clamp assembly 102 may include a clamshell bucket. For example, the clamp assembly 102 may include a pair of clamps 106A-B that pivotably open and close. The clamp assembly 102 may open to receive a load material 108, or a portion thereof. The clamp assembly 102 may couple to the lift assembly 104. For example, the clamp assembly 102 may hang and/or dangle from the lift assembly 104. The lift assembly 104, or a vehicle attached to the lift assembly 104, may position the clamp assembly 102 along a top or an end of the load material 108. Detailed examples of the clamp assembly 102 are described in the discussion referring to FIGS. 2-7.

In some examples, the lift assembly 104 may include boom for positioning the clamp assembly 102. For example, the lift assembly 104 may include a trailer, a motorized vehicle, a non-motorized vehicle (such as a trailer) and/or a portion of thereof. Alternatively or in addition, the lift assembly 104 may include wheels, such as a triaxle, that support the weight of material loaded by the clamp assembly 102. In some examples, the lift assembly 104 may include hydraulic and/or electric controls that control operation of the clamp assembly 102. For example, the lift assembly 104 may include electronic or hydraulic controls that raise or lower the clamp assembly 102. The electronic or hydraulic controls may cause the clamshells 106 to pivot to scoop portions of the load material 108. Detailed examples of the lift assembly 104 are described in the discussion referring to FIG. 8.

The load material 108 may include a granular and/or fibrous material. For example, the load material 108 may include animal feed stuff, mulch, seed, fertilizer and/or other examples of agricultural material. In some examples, the load material 108 may be stored in a packaging that retrains and/or or compresses the material. The density of the load material 108 may vary depending on material properties, such as moisture level, fiber length, or other properties. Packaging the load material 108 may increase the density of the material by three times, or more, the original density. Load material 108 that is released from the packaging may expand or spill. The load material 108 may be arranged in an elongated horizontal pile for loading. For example, the load material 108 may include silo bag, or some other kind of a horizontal packaging tube. In other examples, the load material 108 may include material that is compressed and/or contained for shipping, loading, unloading, and/or storage.

The clamp 106 A-B may open to receive the load material 108. The lift assembly 104 may lower the clamp assembly 102 such that the load material 108 is positioned between the clamps 106A-B. The clamps 106A-B may close to cut from the sides of the load material 108. Cutting from the sides of the load material 108 may reduce wear and tear on the clamp assembly 102. For example, cutting from the side of the load material 108 may cut with the grain instead of against the grain. The elevation of the clamps 106A-B may be controlled such that the clamps 106A-B avoid scuffing a ground surface below the load material 108 and maximize an amount of material scooped. Alternatively or in addition, cutting from the side may reduced the amount of fuel/energy required to scoop the same amount of load material with traditional equipment, such as a front loader.

The clamps 106A-B may perforate the packaging of the load material 108 to cause a substantially straight cut along the packaging. The straight cut of the packaging may reduce and/or eliminate packaging remnants from forming and mixing with the load material 108. After scooping the load material 108, the packaging surrounding load material 108 that was scooped may be retained. Retaining the packaging may reduce spillage and/or keep the load material 108 compressed during transportation. Alternatively or in addition, the packaging may be removed in one large piece, which increased the ease at which it is separated from the scooped material. Refer to FIGS. 9-12 for an example of a controller that operates the left assembly 104 and/or the clamp assembly 102.

Figure 2:
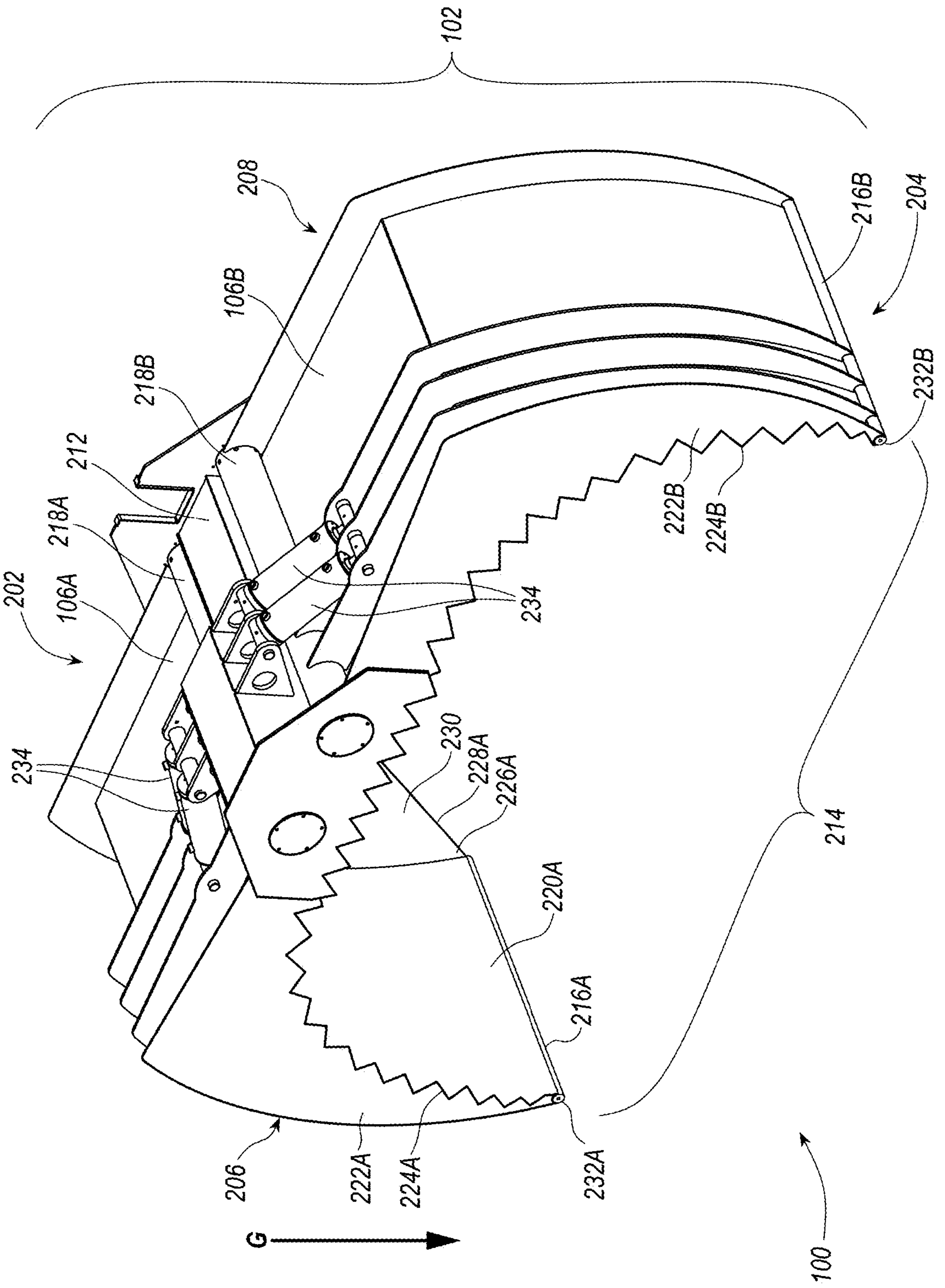
FIG. 2 illustrates a first perspective view of a clamp assembly.

FIG. 2 illustrates a first perspective view of the clamp assembly 102. The clamp assembly 102 may include top 202 and a bottom 204 with respect to gravity G. The clamp assembly 102 may further include a first side 206 and a second side 208. The first side 206 and the second side 208 of the clamp assembly 102 may be disposed between the top 202 and the bottom 204 of the clamp assembly 102.

The clamp assembly 102 may include an assembly body 212. The assembly body 212 may include a rigid structure of the clamp assembly 102. The assembly body 212 may detachably couple to a boom structure, such as the lift assembly 104 described in FIGS. 1 and 8. In some examples, the clamp assembly 102 may couple to the boom structure such that the second side of the clamp assembly 102 is substantially faces the boom structure. The clamp assembly 102 may hang or dangle from the boom structure. During operation, the load material 108 may be positioned at the bottom of the clamp assembly. The assembly body 212 may pivotally couple to the clamps 106A-B at pivot joints included on the assembly body 212.

The clamps 106A-B may pivot and/or rotate about the pivot joints of the assembly body 212. The assembly body 212 may be located at or near a top of the clamp assembly 102 and the clamps 106A-B may pivot and/or rotate to the sides of and/or beneath the assembly body 212. The clamps 106A-B may define a scoop space 214 between the clamps 106A-B. Depending on the location of the pivot joints, the assembly body 212 may further define the scoop space 214. The clamps 106A-B may pivot away from each other to expand the scoop space 214 and toward each other to contract the scoop space 214.

The clamps 106A-B may each include respective tips 216A-B and respective bases 218A-B. The bases 218A-B of the clamps 106A-B may pivotally couple to the assembly body 212. The tips 216A-B of the clamps 106A-B may be located at an opposite end of the clamps 106A-B with respect to the bases 218A-B of the clamps 106A-B. Alternatively or in addition, the tips 216A-B of each of the clamps 106A-B may pivot about the bases 218A-B of each of the clamps 106A-B. The tips 216A-B of each of the clamps 106A-B may rotate toward each other to contract the scoop space 214 and away from each other to expand the scoop space 214. The tips 216A-B and the bases 218A-B of the clamp 106A-B may be defined or disposed between the first side 206 and the second side 208 of the clamp assembly 102.

Figure 3:
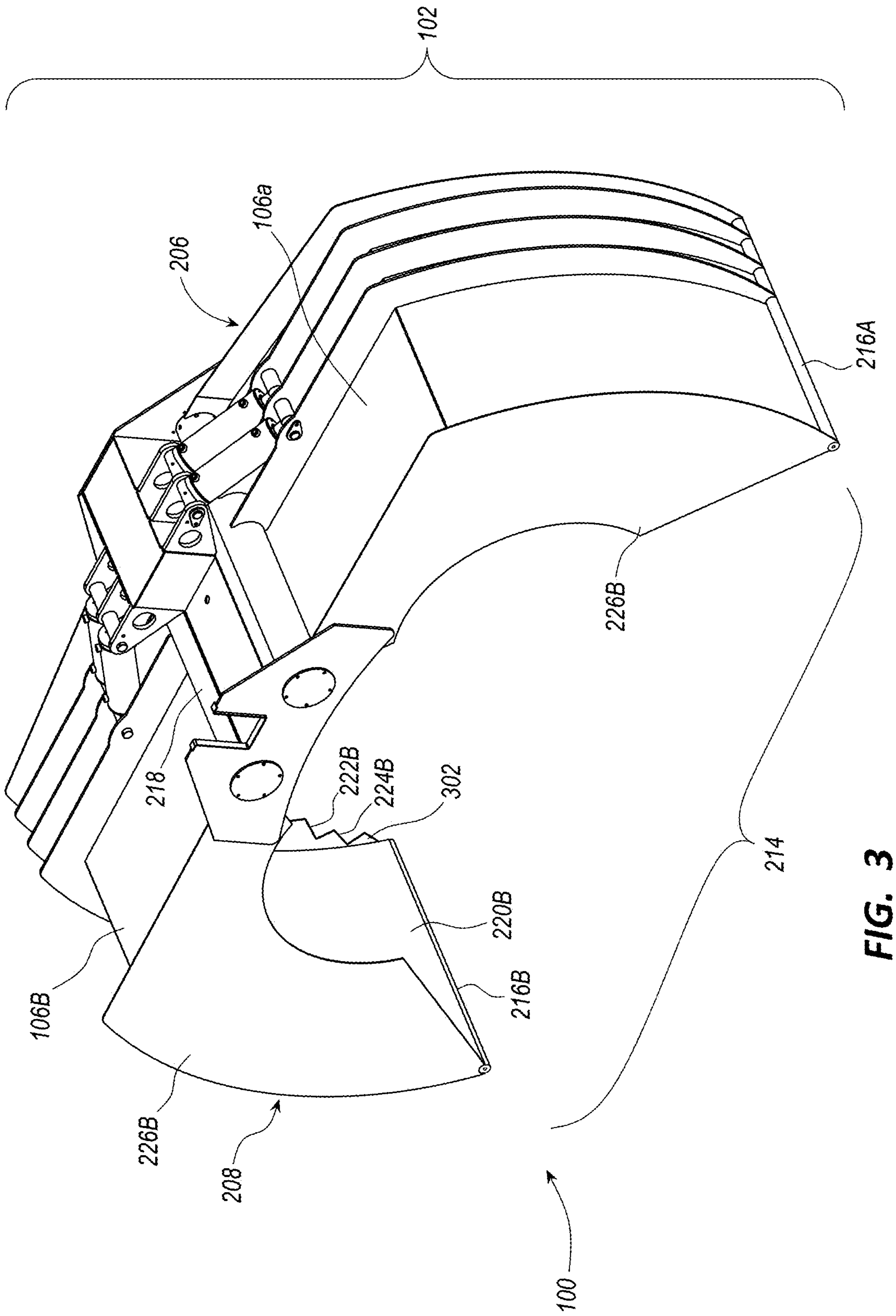
FIG. 3 illustrates a second perspective view of a clamp assembly.

Each of the clamps 106A-B may include opposing scooping surfaces 220A-B (220B shown in FIG. 3). The scooping surfaces 220A-B may be disposed between the sides 206, 208 of the clamp assembly 102. Alternatively or in addition, the opposing scooping surfaces 220A-B may disposed between the respective tips 216A-B and the respective base 218A-B of the clamps 106A-B. In some examples, the scooping surfaces 220A-B may define an arcuate curve between the base 218 and tip 216 of each of the clamps 106A-B. The scooping surfaces 220A-B of the clamps 106A-B may at least partially define the scoop space 214 between the clamps 106A-B.

The clamps 106A-B may include a respective cutting plates 222A-B. The cutting plates 222A-B may include a cutting plate 222A of the first clamp 106A and an opposing cutting plate 222B of the second clamp 106B. In some examples, the cutting plates 222A-B may be positioned at the first side 206 of the clamp assembly 102. In other examples, the clamps 106A-B may have additional or alternative cutting plates positioned at the second side 208 of the clamp assembly 102.

The cutting plates 222A-B may include respective perforating edges 224A-B for cutting into material in the scoop space 214. The perforating edges 224A-B may be disposed between the base 218A of the clamp 106A and the tip 216A of the clamp 106A. For example, the perforating edge 224A may extend from the tip 216A to the base 218A of the clamp 106A on the first side 206 of the clamp assembly 102. Alternatively or in addition, the perforating edge 224A may extend into to the scoop space 214 relative to the scooping surface 220A of the clamp 106A. For example, the perforating edge 224A may be offset from the scooping surface 220A.

The perforating edges 224A may include an edge that perforates and/or cuts packaging. The perforating edge 224 may include a series of edges. For example, the perforating edge 224A may include a plurality of teeth. The teeth may include a series of jagged edges that extend toward or into the scoop space 214 and/or away from the scooping surface 220A of the clamp 106A. The teeth may be uniformly or non-uniformly distributed along all or a portion of the perforating edges 224A between the base 218A and the tip 216A of the clamp 106A. Alternatively or in addition, the teeth may have various widths and/or lengths, depending on design considerations, such as the load material 108 being cut. The opposing perforating edge 224B of the opposing cutting plate 222B may have the same or similar pattern, edges, and/or teeth as the perforating edge 224A of the cutting plate 222.

The clamps 106A-B may further include a retention plates 226A-B (226B shown in FIG. 3). The retention plates 226A-B may include a retention plate 226A of the clamp 108A and an opposing retention plate 226B of the opposing clamp 106B. The retention plates 226A-B may be located on the second side 208 of the clamp assembly 102. In other examples, the clamp assembly 102 may include additional or alternative retention plates on the first side 206 of the clamp assembly 102. The retention plates 226A-B may retain material received in the scoop space 214. For example, the scooping surface 220A of the clamp 108A may be defined between the cutting plate 222A and the retention plate 226A of the clamp 108A. The scooping surface 220B of the clamp 108B may be defined between the cutting plate 222B and the retention plate 226B of the opposing clamp 108B.

The retention plates 226A-B may include respective retention edges 228A-B (228B shown in FIG. 3). The retention plates 226A-B may extends away from the respective scooping surfaces 220A-B and/or into the scoop space 214. For example, the retention edge 228A of the clamp 106A may extend toward the retention edge 228B of the opposing clamp 106B. The retention edge 228B of the opposing clamp 228B may extend toward the retention edge 228A of the clamp 106A. The retention plate 226A of the clamp 106A may include an inner surface 230. Alternatively or in addition, the retention plate 226B of the clamp 106B may include an inner surface (not visible in FIG. 2). The inner surfaces of the retention plates 226A-B may be defined, respectively, between the retention edges 228A-B and the scooping surfaces 220A-B.

In some examples, the clamp 106A-B may further include respective bars 232A-B at the tips 216A-B of the clamps 106A-B. For example, the bars 232A may extend between the first side 206 and the second side 208 of the clamp assembly 102. In some examples, the bar 232A may be a cylindrical bar. The bar 232A may couple to the clamps 106A at any point along the tip 216A of the clamp 106A. In some examples, the bar 232A may couple to the cutting plate 222A and the retention plate 226A at, or proximate to, the tip 216A of the clamp 106A.

In some examples, the clamp assembly 102 may include hydraulic actuators 234 that pivot the clamp 106A and the opposing clamp 106B. For example, the hydraulic actuators 234 may include a first hydraulic actuator that pivots the clamp 106A and a second hydraulic actuator that pivots the clamp 106B. The first hydraulic actuator may pivotably couple to the assembly body 212 and the clamp 106A. The second hydraulic arm may pivotably couple to the assembly body 212 and the opposing clamp 106A. Alternatively or in addition, the clamp assembly 102 may include multiple hydraulic actuators 234 for each of the clamps 106A-B, as illustrated in FIG. 2.

As defined herein, a hydraulic actuator may refer to a hydraulic component that uses hydraulic fluid to move or apply force to an object. A hydraulic actuator may include a hydraulic cylinder and/or a fluid motor that moves a piston with hydraulic fluid to exert a force.

In some examples, the hydraulic actuators 234 may be offset with respect to the first side 206 and the second side 208 of the clamp assembly 102. For example, the hydraulic actuators 234 may be closer to the first side 206 of the clamp assembly 102 than the second side 208. Offsetting the hydraulic actuators 234 toward the first side 206 of the clamp assembly 102 may position the hydraulic actuators 234 closer to the cutting plates 222A-B of the clamps 106A-B to increase power for cutting.

While reference to a particular one of the clamps 106A-B is made through the discussion of the clamp assembly described herein, it should be appreciated that the structural features of the particular one of the clamps 106A-B may be included and/or mirrored on an opposing one of the clamps 106A-B. For example, both of the of the clamps 106A-B may include matching, similar, and/or mirrored tips 216A-B, bases 218A-B, cutting plates 222A-B, cutting edges 224A-B, retention plates 226A-B, retention edges 228A-B and/or bars. In some examples, some or all of the of clamp 106A may be included on the clamp 106B on the same side of the clamp assembly. Likewise, some or all of the features included on the opposing clamp may be included on the same side of the clamp assembly 108.

FIG. 3 illustrates a second perspective view of the clamp assembly 102. The cutting plate 222A may include an inner surface 302 defined between the scooping surface 220A and the perforating edge 224A. The opposing cutting plate 222B may include an inner surface defined between the scooping surface 220A and the perforating edge 224B (hidden in FIG. 3). The inner surface 302 of the cutting plate 222A may further define scoop space 214. Alternatively or in addition, the scoop space 214 may be defined between the inner surfaces of the cutting plates 222A-B, the inner surfaces 230A-B of the retention plate 226A-B, the scooping surfaces 220A-B of each of the clamps 106A-B, a ground surface, and/or an inner surface of the assembly body 212 that faces the ground surface.

Figure 4:
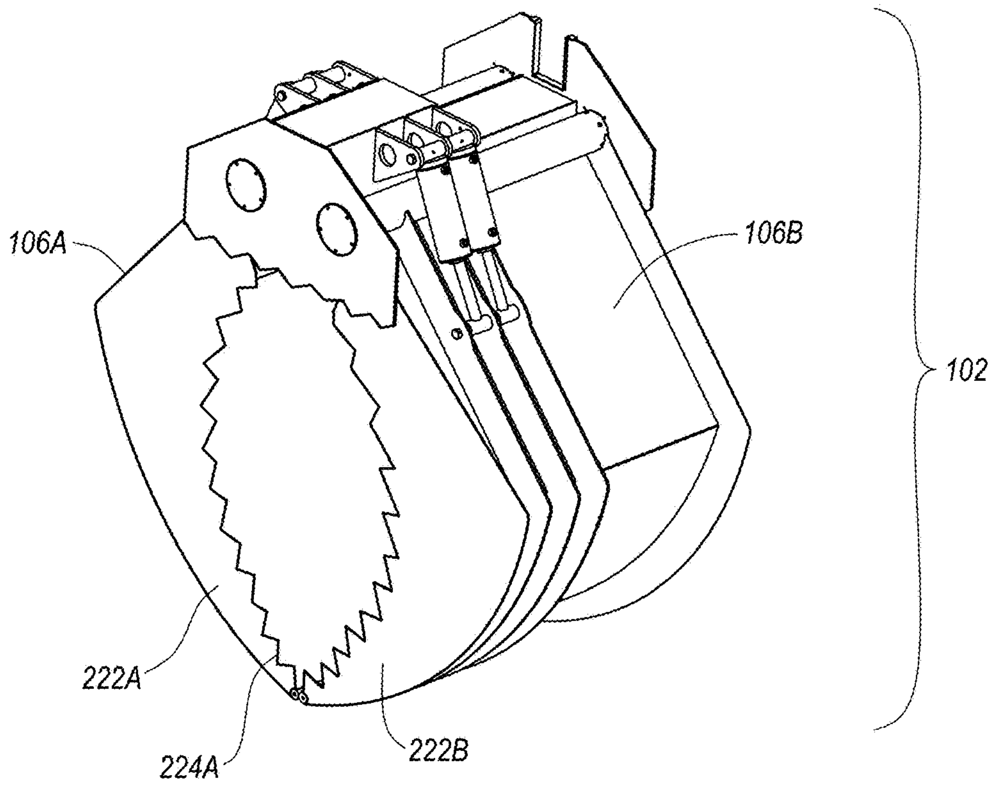
FIG. 4 illustrates a third perspective view of a clamp assembly.

FIG. 4 illustrates a third perspective view of the clamp assembly 102. When the clamps 106A-B close, the cuttings plates 222A-B may move closer to each other. When the clamps 106A-B open, the cutting plates 222A-B may move farther from each other. For example, the perforating edge 224A of the clamp 106A may face the perforating edge 224B of the opposing clamp 106B. Opening the clamps 106A-B may cause the perforating edges 224A-B of the clamps 106A-B to move away from each other. Closing the clamps 106A-B may cause the perforating edges 224A-B of the clamps 106A-B to move toward each other and cut into material disposed between the clamps 106A-B.

Figure 5:
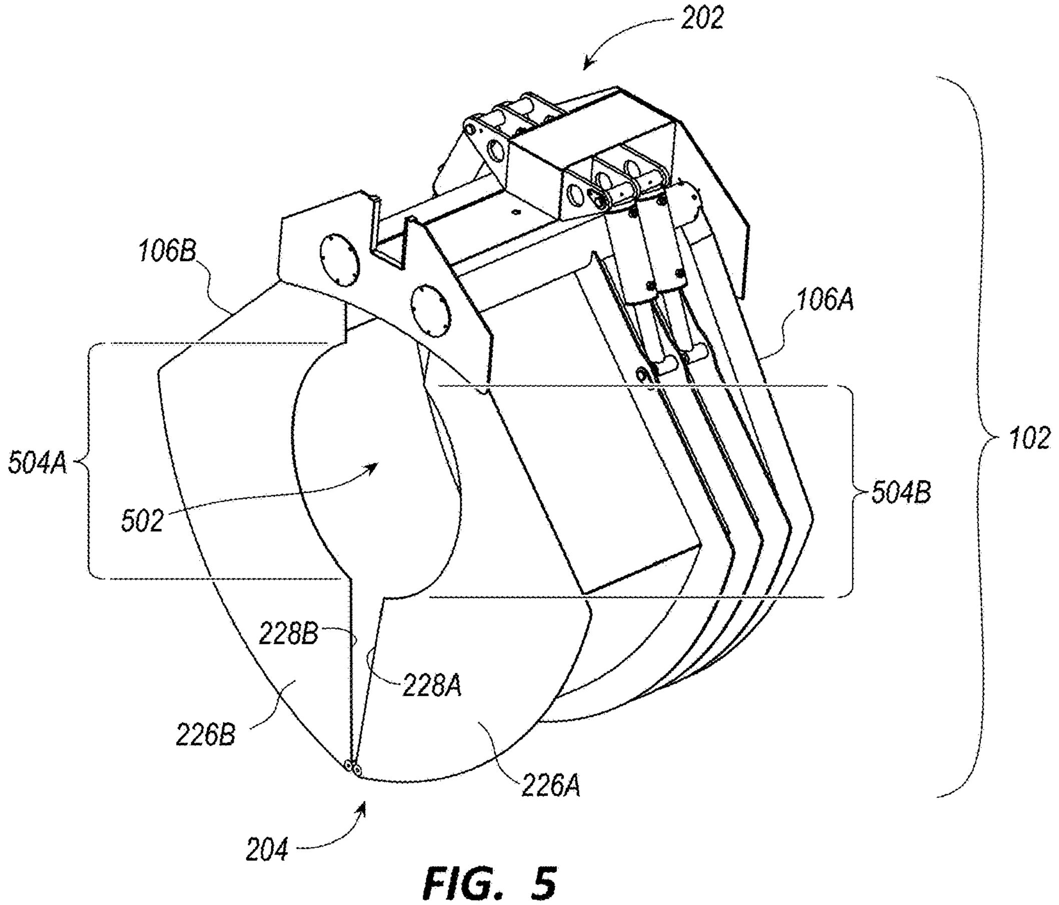
FIG. 5 illustrates a fourth perspective view of a clamp assembly.

FIG. 5 illustrates a fourth perspective view of the clamp assembly 102. The clamps 106A-B may define a window 502 between the clamps 106A-B. For example, the window 502 may be defined between the retention plates 226A-B of the clamps 106A-B on the second side 208 of the clamp assembly 102. Alternatively or in addition, each of the retention plates 226A-B may include a notch or recess that defines the window 502.

In some examples, the retention edges 228A-B of the clamp 106A may include respective recessed edge portions 504A-B. The recessed edge portions 504A-B may include a recessed edge portion 504A and an opposing recessed edge portion 504B. The recessed edge portion 504A may be included along the retention edge 228A of the clamp 106A. The opposing recessed edge portion 504B may be included along the retention edge 228B of the opposing clamp 106B.

The window 502 may be defined between the recessed edge portion 504A and the opposing recessed edge portion 504B when the clamps 106A-B are closed. A distance between the recessed edge portions 504A-B may be greater than a distance between a respective remaining portions of the retention edges 228A-B. Alternatively or in addition, the recessed edge portions 504A-B may be closer to the respective scoop surfaces 220A-B than the respective remaining portions of the retention edges 228A-B. For example, the respective remaining portions of the retention edges 228A-B may touch and/or overlap when the clamps 106A-B are closed. The respective recessed edge portions 504A-B may be separated to define the window 502. In some examples, the window 502 may be offset along the retention plates 226A-B such the window 502 is closer to the top 202 of the clamp assembly 102 than the bottom 204.

Figure 6:
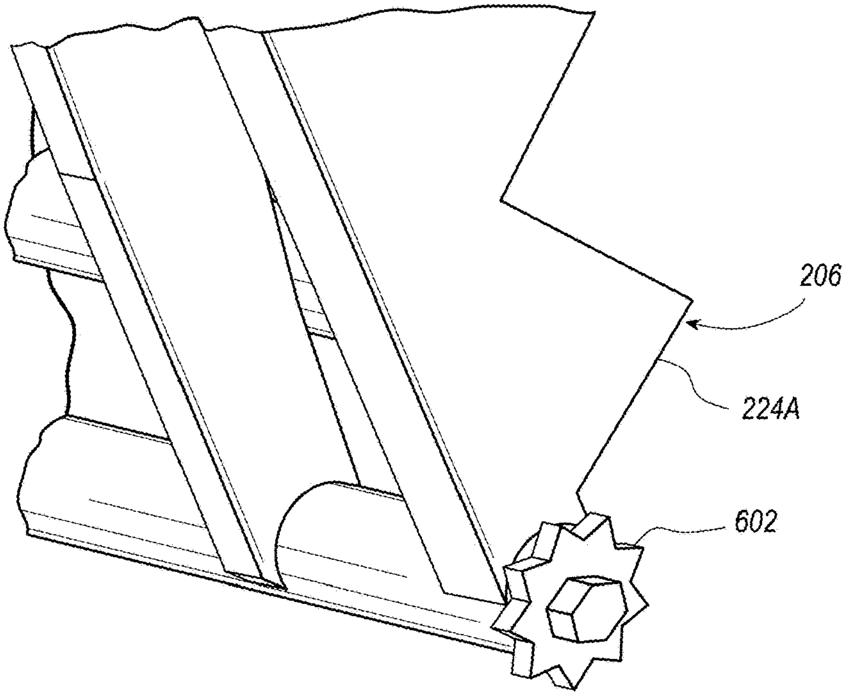
FIG. 6 illustrates an example of a perforating wheel for a clamp assembly.

FIG. 6 illustrates an example of a perforating wheel 602 for the clamp assembly 102. In some examples, the perforating wheel 602 may be rotatably coupled to the clamp assembly 102. For example, the clamp 106A may include the perforating wheel 602 at the tip 216A of the clamp 106A. Alternatively or in addition, the perforating wheel 602 may be coupled to the first side 206 of the clamp assembly 102. In some examples, the perforating wheel 602 may include blades and/or spikes configured to perforate the packaging of the load material 108.

In some examples, the perforating wheel 602 may rotatably couple to the bar 232A of the clamp 106A. A radius of the perforating wheel 602 may be greater than a radius of the bar 232A such that the blades and/or spikes extend closer to the ground than the bar. As the clamp assembly 102 is lowered and/or the clamps 106A pivots, the perforating wheel 602 may rotate along the load material 108 and perforate the packaging of the load material 108.

In some examples, the clamp assembly 102 may include two or more perforating wheels. For example, the clamp 106A may include a first perforating wheel and the opposing clamp 106B may include a second perforating wheel. The first perforating wheel and the second perforating wheel may be positioned on the same side of the assembly as the respective cutting plates 222A-B for the clamps 106A-B. In other examples, the clamp assembly 102 may include additional or alternative perforating wheels that are located, for example, on the second side 208 of the clamp assembly 102.

Figure 7:
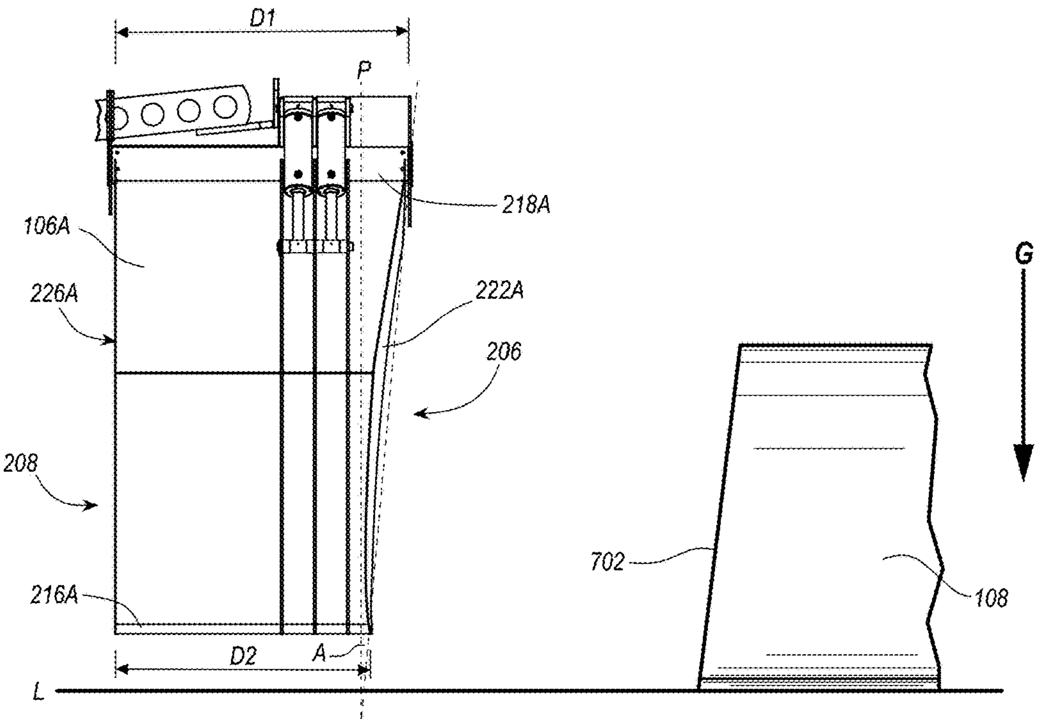
FIG. 7 illustrates an orthogonal view of a clamp assembly.

FIG. 7 illustrates an orthogonal view of the clamp assembly 102. The cutting plates 222A-B, or a portion thereof, may be angled. For example, the clamp assembly may receive a portion of load material 108 arranged on a ground plane L. At least a portion of the cutting plate may be angled so that a cut edge 702 of a remainder of the load material 108 is sloped with respect to a ground plane (L). The angled cut edge 702 may decrease the amount of load material that falls off or slides off the load material pile. Alternatively or in addition, the angled cut edge 702 may prevent the load material 108 from falling out of packaging that contains the load material 108.

In some examples, at least a portion of a cutting plate 222A may be angled such that a first portion of the cutting plate 222A at or proximate to the base 218A extends further away from the second side 208 of the clamp assembly 102 than a second portion of the cutting plate 222A at or proximate to the tip 216A.

Alternatively or in addition, the cutting plate 222A may be angled such that a first distance D1 between the retention plate 226A and the cutting plate 222A along the base 218A of the clamp 106A is greater than a second distance D2 may be defined between the retention plate 226A and the cutting plate 222A along the tip 216A of the clamp 106A. In some examples, both of the cutting plates 222A-B may be at an angle A, with respect to a plane P perpendicular to the ground plane L. The angle A may, for example, be between 5 and 7 degrees.

Figure 8:
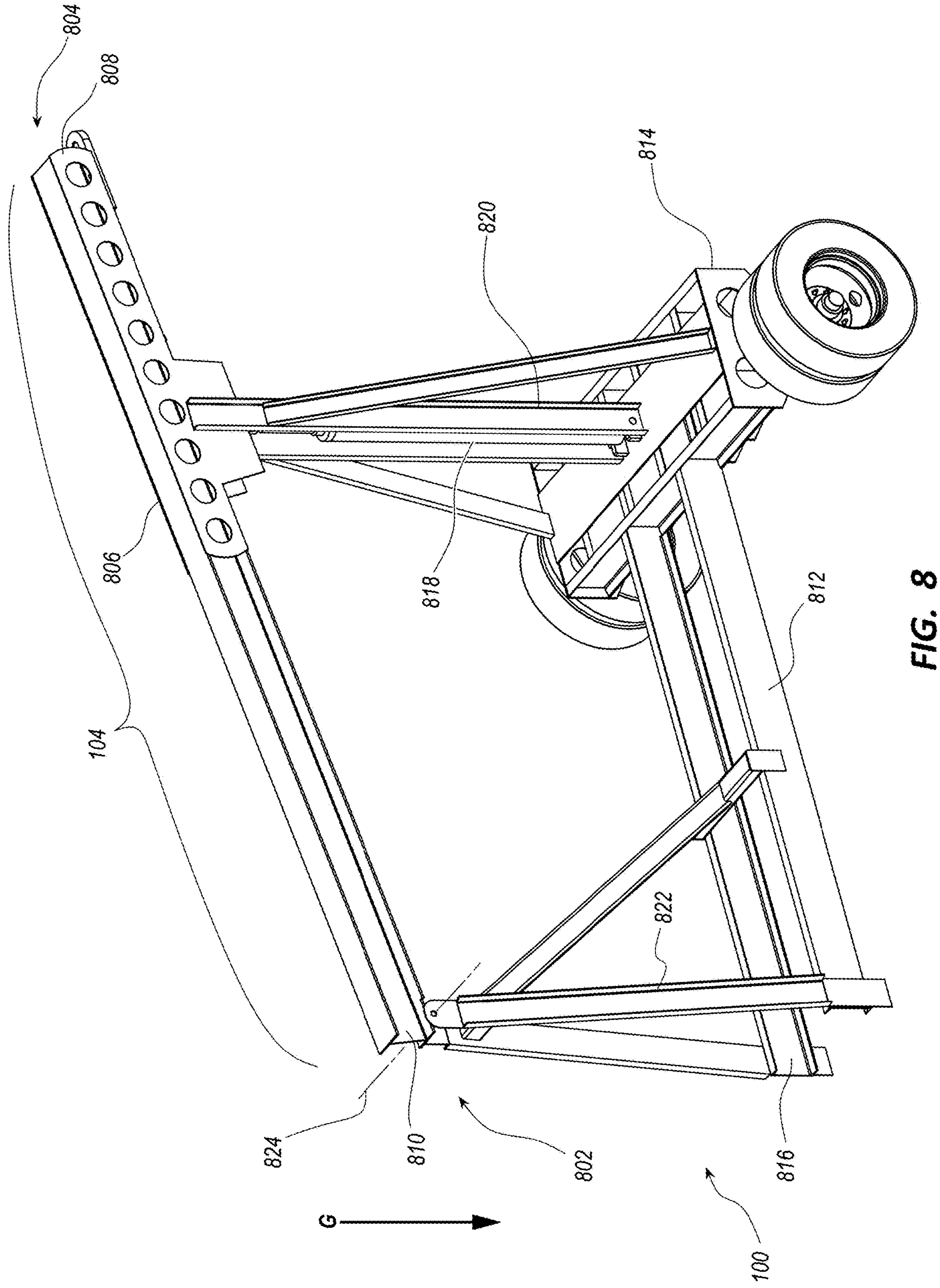
FIG. 8 illustrates a perspective view of a lift assembly.

FIG. 8 illustrates a perspective view of the lift assembly 104. The lift assembly 104 may include a front 802 and a rear 804. The lift assembly 104 may include a longitudinal member 806. The longitudinal member 806 may include a boom arm, such as a beam and/or jib. The longitudinal member 806 may include a first end 808 and a second end 810. The first end 808 of the longitudinal member 806 may be positioned at or proximate to the rear 804 of the lift assembly 104. During loading and unloading, the first end 808 may be positioned over the load material 108. The second end 810 of the longitudinal member 806 may be positioned at or proximate to the front 804 the lift assembly 104.

The longitudinal member 806 may include a connection point that receives a bucket, such as the clamp assembly 102 described in FIGS. 2-6. The connection point me be located at or near the first end 808 of the longitudinal member 806. The space below the first end 808 of the longitudinal member 806 may include a loading space where an attached bucket may receive material.

The lift assembly 104 may include a lift frame 812. In some examples, the lift frame 812 may include a frame of a trailer or vehicle. For example, the lift frame 812 may attach to wheels. In other example, the lift frame 812 may be mounted to a trailer or vehicle. A first end 814 of the lift frame 812 may be located at or proximate to the rear 804 of the lift assembly 104. A second end 816 of the lift frame 812 may be positioned at or proximate to the front 802 of the lift assembly 104. In some examples, the lift frame 812 may attach to a vehicle at the second end 816 of the lift frame 812.

The lift assembly 104 may further include a hydraulic actuator 818. The hydraulic actuator 818 may raise and/or lower the longitudinal member 806. The hydraulic actuator 818 may be coupled with or abut the longitudinal member 806 and/or the lift frame 812. The hydraulic actuator 818 may apply force to the longitudinal 818 member to lift the longitudinal member 806. For example, hydraulic actuator 818 may contact the longitudinal member 806 between the center of the longitudinal member 806 and the first end 808 of the longitudinal member 806.

The lift assembly 104 may include a mast 820. The mast 820 may be supported by the lift frame 812 and vertically extend away from the lift frame 812. For example, a bottom end of the mast 820 may be positioned on the lift frame 812. The mast 820 may support and/or receive the longitudinal member 806. For example, a gap or notch in the mast 820 may receive the longitudinal member 806 at a top end of the mast 820. The longitudinal member 806 may raise and lower at least partially within the gap. The gap may open at the top end of the mast 820 and extend toward the bottom of the mast 820. In some examples, the mast 820 may include an I-beam. The web of the I-beam may be notched to receive the longitudinal member 806. Alternatively, the mast 820 may include two opposing side rails that are spaced apart to define the gap and/or receive the longitudinal member 806. In some examples, the hydraulic actuator 818 may be positioned at least partially within the gap. The longitudinal member 806 may rest on, or couple to, the hydraulic actuator 818 within the gap.

The lift assembly 104 may further include a vertical member 822 (or vertical members). The vertical member 822 may be supported by the lift frame 812 and vertically extend from the lift frame 812. Alternatively or in addition, the vertical member 822 may be a portion of the lift frame 812.

A bottom end of the vertical member 822 may be positioned on and/or couple to the lift frame 812. The longitudinal member 806 may pivotably couple to the vertical member 822. As the hydraulic actuator 818 raises or lowers, the longitudinal member 806 may rotate about a pivot axis 824 that extends through the longitudinal member 806 and the vertical member 822. For example, the longitudinal member 806 may pivot the pivot axis 824.

In some examples, the mast 820 may be located proximate to the rear 804 of the lift assembly 104 and/or the first end 814 of the lift frame 812. The vertical member 822 may be located proximate to the front 802 of the lift assembly 104 and/or the second end 816 of the lift frame 812. Alternatively or in addition, the longitudinal member 806 may detachably couple to a bucket, such as the clamp assembly 102 illustrated in FIGS. 2-7. The bucket or clamp assembly 102 may detachably couple to the longitudinal member 806, proximate to the first end 808 of the longitude member 806 and/or the rear 804 of the lift assembly 104. A second end 810 of the longitudinal member 806 may pivotally couple to the vertical member 822 and/or the lift frame 812.

Figure 9:
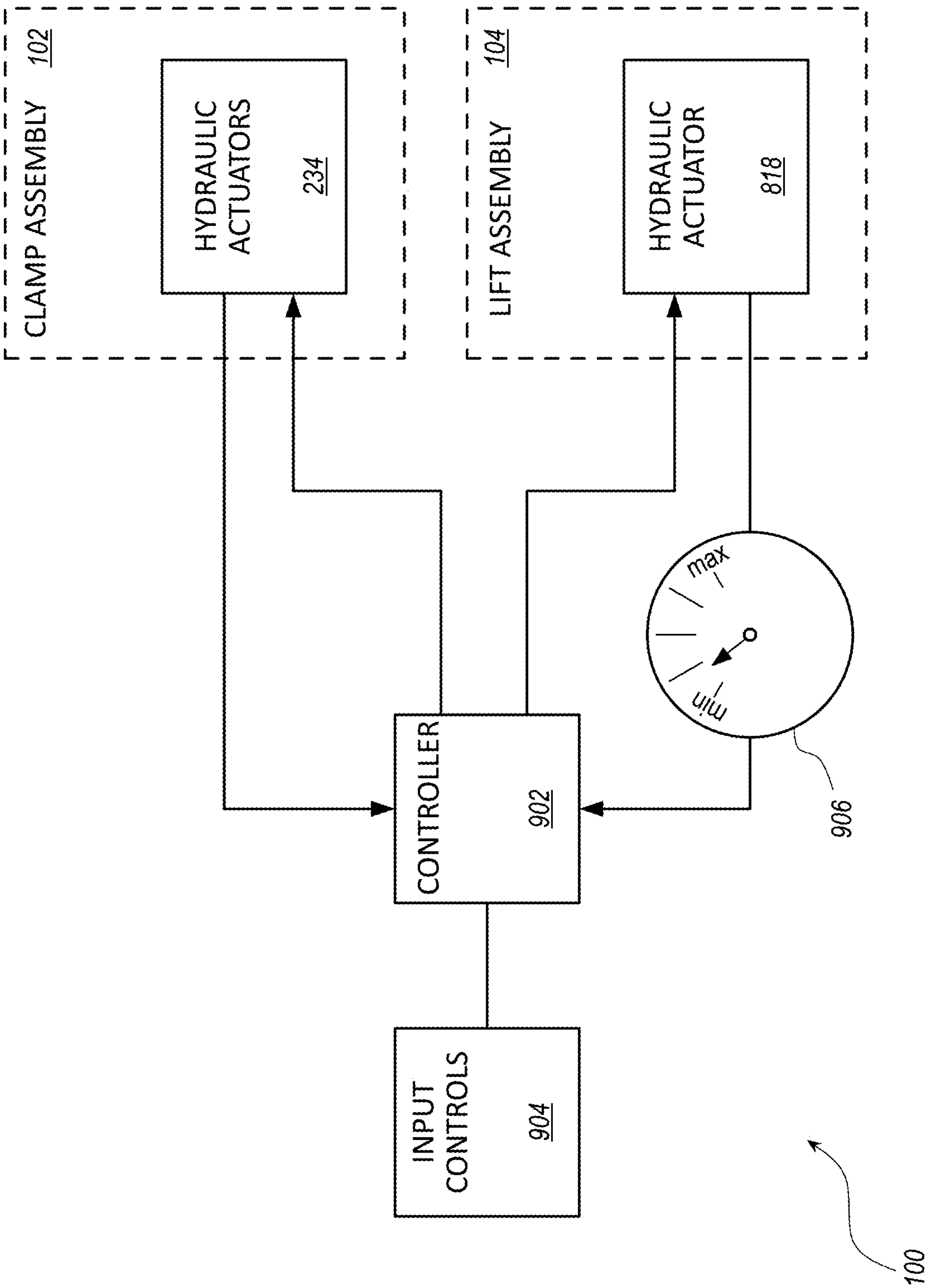
FIG. 9 illustrates an example of a controller 902 for a clamshell bucket system.

FIG. 9 illustrates an example of a controller 902 for the system 100. The controller 902 may operate the clamp assembly 102 and/or lift assembly 104. Operation of the lift assembly 104 may include expansion and/or contraction of the hydraulic actuator 818 of the lift assembly 104. For example, the controller 902 may cause the hydraulic actuator 818 expand to lift the longitudinal member 806 and increase an elevation of the clamp assembly 102, with respect to gravity. The controller 902 may cause the hydraulic actuator 818 to contract to lower the longitudinal member 806 and decrease the elevation of the clamp assembly 102. The elevation may refer to a distance between the tips of at least one of the clamp assembly 102 and the ground (see FIG. 11).

The controller 902 may vary an operating width W of the clamp assembly 102. The operating width W of the clamp assembly 102 may refer to the distance between the tips 216A-B of the clamp assembly 102 (see FIG. 11). Operation of the clamp assembly 102 may include expansion and/or contraction of the hydraulic actuators 234 of the clamp assembly 102. The controller 902 may cause the hydraulic actuators 234 of the clamp assembly 102 to open or close the clamps 106A-B. For example, the controller 902 may cause the hydraulic actuators 234 to expand to close the clamps 106A-B and contract to open the clamps 106A-B.

In some examples, the controller 902 may coordinate operation of the lift assembly 104 and the clamp assembly 102. In an example, the controller 902 may cause the cutting edges 222B of the clamp assembly 102 to cut the load material 108 and/or the perforating wheel 602 to perforate packaging of the load material 108. For example, the controller 902 may cause the hydraulic actuator 808 of the lift assembly 104 to lower the clamp assembly 102 onto the load material 108. As the clamp assembly 102 is lowered onto the load material 108, the pair of clamps 106A-B may open. In some examples, the reactionary force exerted on the tips 216A-B of the clamps 106A-B by the load material 108 may cause the clamps 106 A-B to open. Alternatively or in addition, the hydraulic actuators 234 of the clamp assembly 102 may open the tips 216A-B of the clamps 106A-B. As the clamps 106A-B are lowered around the load material 108, the cutting edge 222A-B of the clamps 106A-B may cut into packaging of the load material 108 from the a top and/or sides of the load material 108.

The controller 902 may include a hydraulic control system in which one or more actuators, servos, pumps, and/or other hydraulic components change, control, and/or regulate the flow of fluid to and/or from hydraulic actuators, such as the and/or a hydraulic actuators 818 of the lift assembly 104 and/or the hydraulic actuators 234 of the clamp assembly 102.

Alternatively or in addition, the controller 902 may include an electronic controller, such as a processor, memory, and/or circuitry. The processor may be one or more devices operable to execute logic. The logic may include computer executable instructions or computer code stored in the memory or in other memory that when executed by the processor, cause the processor to perform the features implemented by the logic described herein. The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include a non-transitory computer readable storage medium.

The controller may communicate with other devices and/or actuators that control operation of the hydraulic actuator 104 of the lift assembly 104 and/or the hydraulic actuators of the clamp assembly 102.

In some examples, the system may further include a plurality of input controllers 904. The input controls may include electric and/or mechanical buttons, levers and/or other controls that communicate electrical signals and/or hydric fluid with the controller 902. For example, the input controls may communicate with the controller to operate the clamp assembly 102 and/or the lift assembly 104. In an example, the lift assembly 104 may include or be attached to a vehicle. The vehicle may include the input controls 904 in a cabin of the vehicle. An operator of the vehicle may back the lift assembly 104 up such that the clamp assembly 102 dangles over the load material 108. The operator may scoop a portion of the load material 108.

The system 100 may include a gauge 906 to measure the weight applied to the clamp assembly 102. The gauge 906 may include any electric or mechanical device that indicates pressure and/or weight. For example, the gauge 906 may include a dial or indicator that varies based on a hydraulic pressure. Alternatively, the gauge 906 may include an electronic display that displays visual markers of weight and/or pressure. In some examples, the gauge 906 may be calibrated to display a load weight based on the amount of hydraulic pressure applied to the hydraulic actuator 818 of the lift assembly 104 at various known weights of the clamp assembly 102. Calibrating the gauge 906 may involve adjusting visual weight markers on the gauge 906. Alternatively or in addition, calibrating the gauge 906 may be involve communicating digital parameters to the controller 902 and or gauge 906 to change a display interface that display the visual weight markers.

For example, a gauge 906 may be in fluid communication with the hydraulic actuator 818. A needle or indicator on the gauge 906 may vary depending on the hydraulic pressure fluid applied to the hydraulic actuator 818. An empty clamp assembly 102 may take X PSI to lift. The gauge 906 may be configured with a first visual weight marker (labeled MIN in FIG. 9). The first weight marker may be representative of an initial load weight (i.e. 0 lbs for an empty load) at X PSI. A known weight may be attached to the clamp assembly 102.

The known weight may take Y PSI to lift. The gauge 906 may be configured with an additional weight marker that is representative of the known weight at Y PSI. Alternatively or in addition, multiple weight markers may be added that are based on a linear extrapolation between the initial load weight at X PSI and the known load weight at Y PSI.

By way of example, the anticipated range for the clamp may be between 7,000 lbs. and 27,000 lbs. and the clamp assembly 102 may take 500 PSI to lift when empty. The gauge 906 may be calibrated as follows: Add a first mark to the gauge 906 near the needle at 500PSI. The first mark may be representative of 0 lbs of load weight. Attach a known load weight of 14,000 lbs. to the clamp assembly 102. After the needle moves, add a second mark the gauge 906 near a new location of needle. Determine a distance (i.e. angular distance) between the first mark and the second mark. Add a third mark to the gauge 906 such that distance between the first mark and the second mark is the same as the distance between the second mark and the third mark. The third mark may be representative of 28,000 lbs. Add a fourth mark representative of 7,000 lbs half way between the first and second mark. Add a fifth mark representative of 21,000 lbs half way between the second mark and the third mark.

In other examples, a calibrated scale may be attached to the clamp assembly 102 and the gauge 906 may be configured with the weight readings from the calibrated scale. For example, a various hydraulic pressures may be applied to the hydraulic actuator 818 of the lift assembly 104. Visual weight markers may be configured on the gauge 906 based on respective weight readings of the calibrated scale at the various hydraulic pressures.

Figure 10:
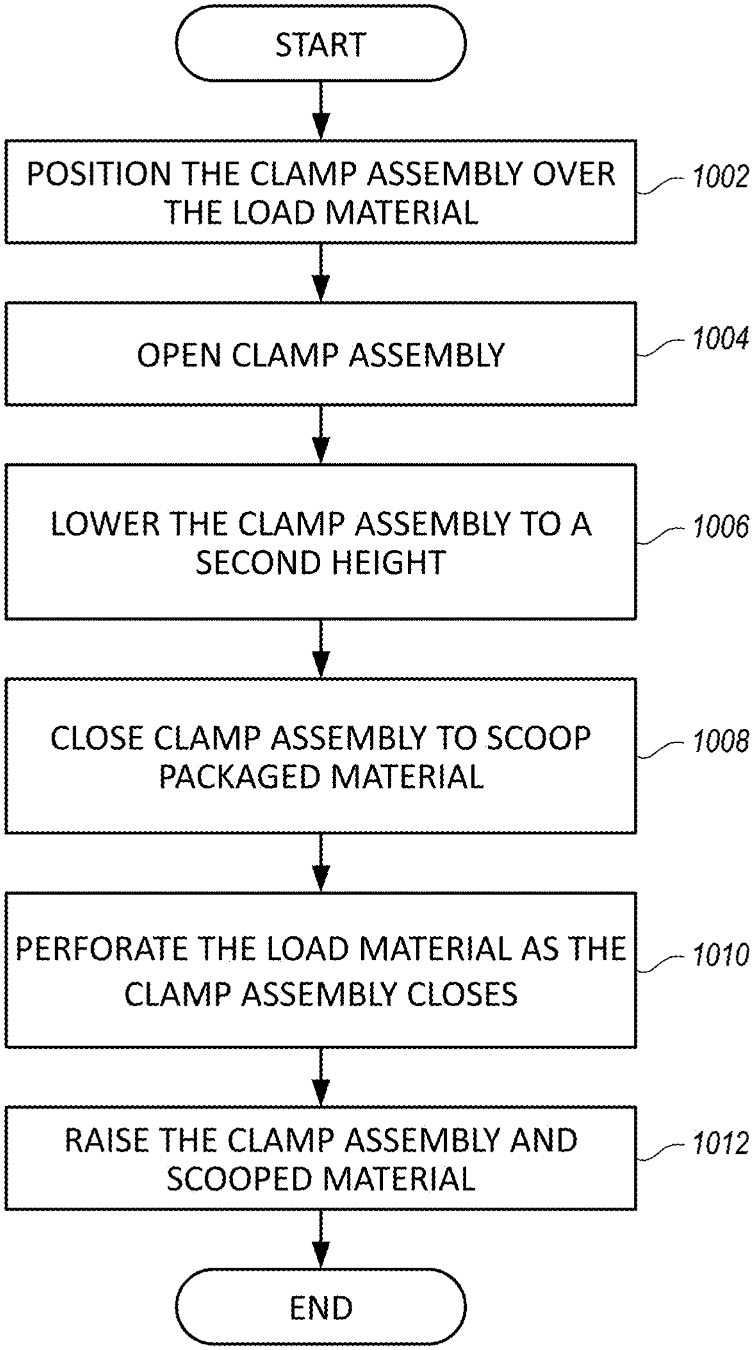
FIG. 10 illustrates a flow diagram for example logic of a clamshell bucket system.
Figure 11:
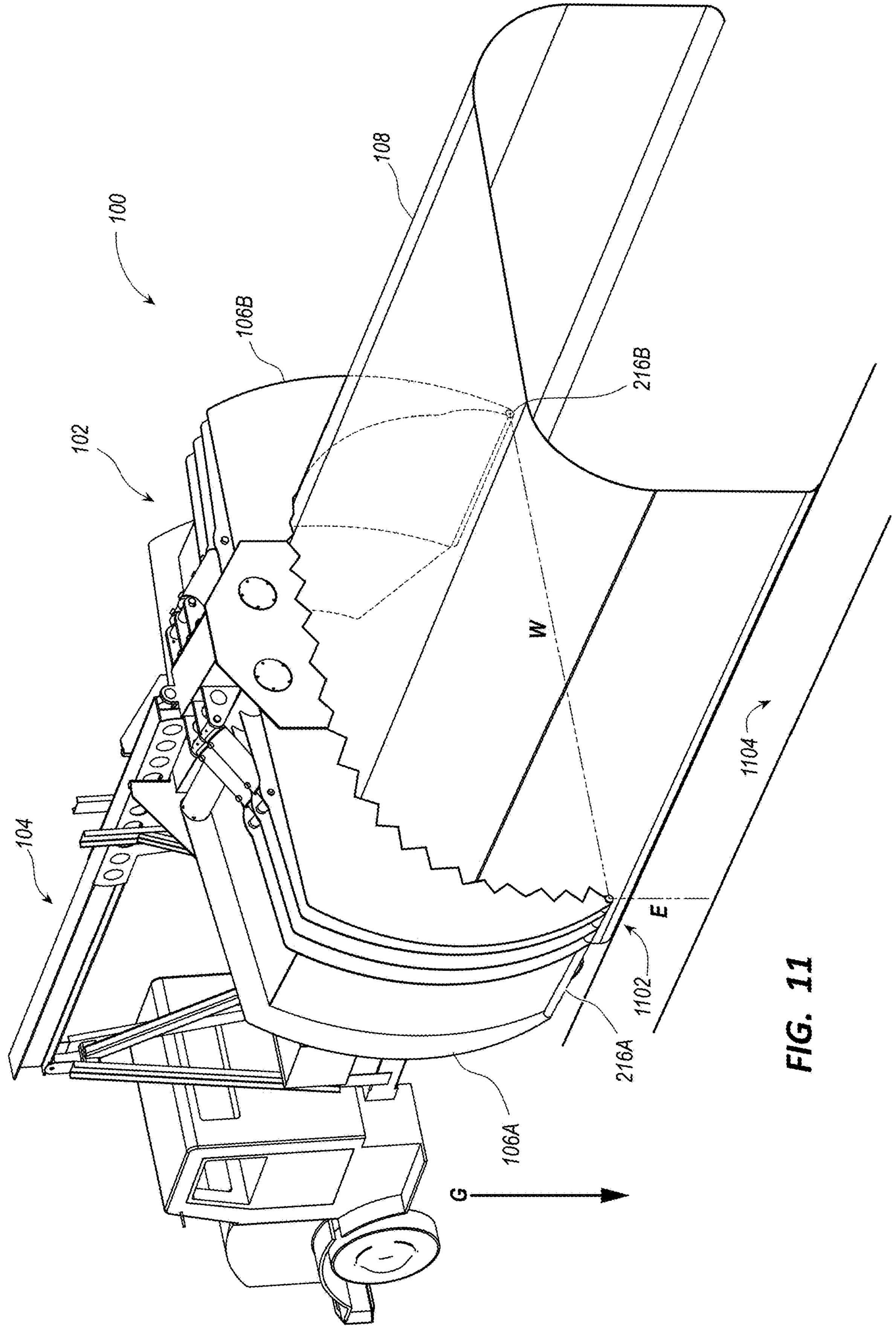
FIG. 11 illustrates a perspective view of a clamshell bucket system during operation.

FIG. 10 illustrates a flow diagram for example logic of the system 100. FIG. 11 illustrates a perspective view of the system during operation. Reference to FIG. 11 is made throughout the following discussion of FIG. 10.

The controller 902 may position the clamp assembly 102 over the load material 108. For example, the lift assembly may be positioned adjacent to an end of the load material 108 such that the clamp assembly 102 dangles over a top surface of the load material 108 with respect to gravity G. The controller 902 may lower an elevation E of the clamp assembly 102 to a first elevation (1002). The first elevation may be the same or less than a height of the load material 108. The controller 902 may open the clamp assembly 102 (1004). For example, the controller 902 may cause the tips 216A-B of the clamp assembly 102 to expand. In some examples, the tips 216A-B of the clamps 106A-B may open to the first width to receive the load material 108. The controller 902 may substantially maintain the first elevation of the clamp assembly 102 as the clamp assembly 102 opens.

The controller 902 may lower the clamp assembly 102 to a second elevation (1006). As the clamp assembly is lowered, the cutting edges 222A-B of the clamp assembly may cut a top and/or sides of the load material 108. The second elevation may be at or near a bottom surface 1102 of the load material 108 and/or the ground surface 1104. Alternatively, the second elevation may be an elevation that is offset from the ground surface 1104 such that the tips 216A-B of the clamps 106A-B do not touch the ground surface 1104 during operation. In some examples, the second elevation may be approximately one inch or less off the ground to maximize an amount of the load material 108 scooped by the clamp assembly 102.

The controller 902 may close the clamp assembly 102 to scoop the load material 108 (1008). For example, the controller 902 may cause the hydraulic actuator(s) 234 of the clamp assembly 102 to retract the clamps 106A-B together. The cutting plates 222A-B of the clamp assembly 102 may dig into the sides of the load material 108.

As the clamps 106A-B close, perforating wheels 602 at the tips 216A-B of the clamps 106A-B may perforate the bottom surface 1102 of the load material 108 (1010). For example, the perforating wheels 602 may rotate along the bottom surface 1102 of the load material 108 and/or the ground surface 1104 that supports the load material 108. In examples where the load material 108 is disposed within packaging, the perforating wheels 602 may form a perforation in the packaging. For example, the perforating wheels 602 may roll along the ground and/or the packaging and perforate the packaging. The perforation may facilitate clear tearing as the load material 108 pinched between clamps 106A-B is pulled away.

In various examples, it may be beneficial to control the elevation of clamp assembly during opening and closing of the clamps 106A-B. For example, the controller 902 may simultaneously raise the clamp assembly 102 and close the clamps 106A-B to cause the perforating wheels 602 to rotate along the bottom surface of the load material 108. In various examples, the controller 902 may maintain the clamp assembly 102 at the second elevation in response to closing the clamp assembly. For example, the controller 902 may substantially keep the tips 216A-B of the clamp assembly 102 at or near the second elevation as the controller 902 closes the clamps 106A-B. Alternatively or on addition, the controller 902 raise the clamp assembly 102 in response to the tips 216A-B being less than or greater than a threshold offset from the second elevation. For example, the controller may prevent the tips 216A-B from digging into the ground.

In some examples, is examples, the controller may receive triggers to lower, close, raise, and/or open the clamp assembly 102. A trigger may include an electrical or mechanical response to operator input provided via the input controls 904. The controller may receive or detect the trigger. In response to receiving or detecting the trigger, the controller may cause the hydraulic actuator 818 of the lift assembly 104 to raise the clamp assembly 102 and, simultaneously, cause the hydraulic actuator(s) 234 of the clamp assembly 102 to close the clamps 106A-B.

In some implementations, the clamps 106A-B may close such that a predetermined load width, which is the width between the tips of the clamps 106A-B when the clamps are loaded with a loaf of the load material 108. The pressure exerted on the loaf by the clamps 106A-B may cause the load to be retained between the clamps 106A-B. The cutting plates 222A-B of the clamps 106A-B may create a clean cut along the sides and through the load material 108 to minimize spillage. The perforating wheel may perforate a portion of the packaging of the load material 108 such that an unperforated portion of the packaging between the tips 216A-B of the clamps 106A-B tear more easily when the clamp assembly 102 are lifted away with the load of packaging materials. The window 502 defined between the retention plates may allow an operator to view the loaf of the load material 108 received by the clamp assembly 102 throughout the loading, transportation, and unloading procedure.

The controller 902 may raise the clamp assembly 102 and the scooped material (1012). The load material 108 and/or the packaging of the load material 108 may tear along a perforation formed by the perforating wheels 602. After the clamp assembly 102 is raised, the clamp assembly 102 may be locked to the lift assembly 104 for transportation. The clamp assembly 102 may be unlocked and lowered for unloading.

The logic illustrated in the flow diagram may include additional, different, or fewer operations than illustrated. The operations illustrated may be performed in an order different than illustrated. In addition, a human operator may interface with the controller to cause the lift assembly and/or clamp assembly perform the operations lifted in FIG. 10 and/or other operations described herein.

The clamshell bucket system 100 may be implemented with additional, different, or fewer components. For example, a first system may include clamp assembly 102, a second system may include the lift assembly 104, and a third system may include the controller 902. Alternatively or in addition, at least one of the clamp assembly 102, the lift assembly 104 may be included in the clamshell bucket system 100.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The present disclosure may relate to, among others, at least the following aspects.

A first aspect may include a clamshell bucket comprising. The clamshell bucket system may include a pair of clamps pivotally coupled to an assembly body, the clamps configured to pivot away from each other to expand a scoop space defined between the clamps and pivot toward each other to contract the scoop space. Each of the clamps may respectively include a scooping surface positioned between a tip of a respective clamp and a base of the respective clamp, wherein the respective clamp is coupled to the assembly body at the base of the respective clamp, wherein the tip and the base of the respective clamp are positioned between first and second sides of the respective clamp. Each of the clamps may respectively further include a cutting plate coupled to the first side of the respective clamp, the cutting plate comprising a perforating edge disposed between the base of the respective clamp and the tip of the respective clamp, the perforating edge configured to extend into the scoop space relative to the scooping surface, wherein a first inner surface of the cutting plate is disposed between the scooping surface and the perforating edge. Each of the clamps may respectively further include a retention plate coupled to the second side of the respective clamp, the retention plate including a second inner surface that faces the first inner surface of the cutting plate, wherein the first inner surface of the cutting plate, the second inner surface of the retention plate, and the scooping surface further define the scoop space between the clamps.

A second aspect may include the clamshell bucket of the first aspect, wherein each of the clamps further comprises a perforating wheel rotatably coupled to the cylindrical bar adjacent to the cutting plate, the perforating wheel configured to perforate packaging of a material positioned in the scoop space as the perforating wheel rotates on the packaging.

A third aspect may include the clamshell bucket of any of aspects one to two, wherein each of the clamps further comprises a cylindrical bar coupled to the cutting plate and the retention plate at a tip of the respective clamp, wherein the cylindrical bar extends along the tip of the clamp.

A fourth aspect may include the clamshell bucket of aspect three, further comprising a perforating wheel coupled to the cylindrical bar adjacent to the cutting plate.

A fifth aspect may include the clamshell bucket of any of aspects one to four, wherein the clamps are configured to receive a portion of load material arranged on a base surface, wherein at least a portion of the cutting plate is angled so that a cut edge of a remainder of the load material is sloped with respect to the base surface.

A sixth aspect may include the clamshell bucket of any of aspects one to five, wherein the second inner surface is further defined between an edge of the retention plate and the scooping surface, wherein a first portion of the edge defines a window between the clamps.

A seventh aspect may include the clamshell bucket of any of aspects one to size, further comprising a pair of hydraulic actuators coupled to the assembly body, wherein each of the hydraulic actuators are further coupled to a corresponding one of the clamps, wherein the hydraulic actuators are positioned on the clamps closer to the cutting plate than the retention plate for each of the clamps.

An eight aspect may include a clamshell bucket system. The clamshell bucket system may include a clamp assembly comprising a pair of clamps coupled to an assembly body that pivot to receive material beneath the assembly body, the pair of clamps comprising opposing surfaces disposed between a first side and a second side of the clamp assembly, the clamps configured to pivot away from each other to expand a scoop space defined between the opposing surfaces and toward each other to contract the scoop space. Each of the clamps include a cutting plate positioned at the first side of the clamp assembly, the cutting plate comprising a perforating edge configured to extend into the scoop space relative to a corresponding one of the opposing surfaces, and a retention plate positioned at second side of the clamp assembly, the retention plate including an inner surface that faces the cutting plate, the cutting plate and the retention plate further define the scoop space between the clamps. The clamshell bucket system may further include a lift assembly coupled to the clamp assembly, the lift assembly comprising a hydraulic actuator configured to raise and lower the clamp assembly.

A ninth aspect may include the clamshell bucket system of aspect eight, wherein the lift assembly further comprises a longitudinal member detachably coupled to the top of the clamp assembly, the hydraulic actuator configured to raise and lower the longitudinal member.

A tenth aspect may include the clamshell bucket system of aspect nine, wherein the longitudinal member is detachably coupled to the top of the clamp assembly proximate to a first end of the longitude member, and a second end of the longitudinal member is configured to pivotally couple to a vertical member extending from a frame of a vehicle, wherein the hydraulic actuator contacts the longitudinal member proximate to the first end of the longitudinal member, and the clamp assembly is configured to hang from the longitudinal member at a rear of the vehicle.

An eleventh aspect may include the clamshell bucket system of aspect nine, further comprising a controller configured to cause the hydraulic actuator to change an elevation of the clamp assembly.

A twelfth aspect may include the clamshell bucket system of aspect eleven wherein the clamp assembly further comprises at least two hydraulic actuators respectively coupled to the clamps and the assembly body, the clamshell bucket system further comprising a controller configured to cause the at least two hydraulic actuators to open and close the clamps.

A thirteenth aspect may include the clamshell bucket system of aspect twelve, wherein the controller is further configured to cause the hydraulic actuator to lower the longitudinal member as the clamps open to substantially keep respective tips at an elevation; and cause the hydraulic actuator to raise the longitudinal member as the clamps close to substantially keep the respective tips at the elevation.

A fourteenth aspect may include the clamshell bucket system of any of aspects eight through 14, wherein each of the clamps further include respective cylindrical bars that extend along respective tips of the clamps.

A fifteenth aspect may include a clamshell bucket system comprising a clamp assembly having a top, a bottom, a first side disposed between the top and bottom and a second side disposed between the top and bottom, the clamp assembly configured receive material at the bottom of the clamp assembly. The clamp assembly may further comprise a pair of opposing clamps coupled to an assembly body that pivot to receive the material, the opposing clamps comprising opposing surfaces disposed between the first and second sides of the clamp assembly, the opposing clamps configured to pivot away from each other to expand a scoop space defined between the opposing surfaces and toward each other to contract the scoop space. Each of the opposing clamps may include a cutting plate positioned at the first side of the clamp assembly, the cutting plate comprising a perforating edge configured to extend into the scoop space relative to a corresponding one of the opposing surfaces, and a retention plate positioned at the second side of the clamp assembly, the retention plate including an inner surface that faces the cutting plate, wherein the cutting plate and the inner surface of the retention plate further define the scoop space between the opposing clamps.

A sixteenth aspect may include the clamshell bucket system of aspect fifteen, wherein the clamp assembly further comprises at least two hydraulic actuators respectively coupled to the opposing clamps and the assembly body, wherein the at least two hydraulic actuators are coupled to the assembly body closer to the first side of the clamp assembly than the second side.

A seventeenth aspect may include the clamshell bucket system of aspect sixteen, further comprising a lift assembly detachably coupled to the top of the clamp assembly, the lift assembly comprising a hydraulic actuator configured to raise and lower the lift assembly.

An eighteenth aspect may include the clamshell bucket system of aspect seventeen, further comprising a controller configured to cause the hydraulic actuator to raise the clamp assembly as the opposing clamps pivot together and lower the clamp assembly as the opposing clamps pivot away from each other.

A nineteenth aspect may include the clamshell bucket system of aspect seventeen, further comprising a gauge calibrated with an indicator that represents weight based on a pressure of hydraulic fluid for the hydraulic actuator of the lift assembly.

A twentieth aspect may include the clamshell bucket system of any of aspects fifteen through nineteen, wherein the cutting plate for each of the opposing clamps is angled so that a first distance between the first side and the second side at the top of the clamp assembly is greater than a second distance between the first and second sides at the bottom of the clamp assembly.

A twenty-first aspect may include the clamshell bucket system of any of aspects fifteen through twenty, wherein the cutting plate is configured to cut into a bag of material, and the retention plate is configured to retain the bag of material within the scoop space.

A twenty-second aspect may include a method for operating a clamshell bucket. The method may include positioning opposing clamps of a clamshell bucket over a load material. The method may further include opening the opposing clamps to expand a scoop space between the opposing clamps, the scoop space being positioned above a top surface of the load material. The method may further include lowering the clamshell bucket toward the load material to receive the load material in the scoop space. The method may further include positioning tips of the opposing clamps along a ground surface that at least partially contacts a bottom surface of the load material. The method may further include closing the opposing clamps on the load material. The method may further include perforating, as the opposing clamps are being closed, a bottom surface of load material with perforating wheels respectively attached to the tips the opposing clamps. The method may further include raising, after the opposing clamps are closed, the clamshell bucket and a portion of the load material retained between the clamps.

A twenty-third aspect may include the method of aspect twenty-two 22, wherein closing the opposing clamps on the load material further comprise simultaneously raising the clamshell bucket and closing the opposing clamps to cause the perforating wheels to rotate along the bottom surface of the load material.

A twenty-fourth aspect may include the method of any of aspects twenty-one to twenty-two 22, wherein the load material is disposed in a packaging, wherein perforating, as the opposing clamps are being closed, the bottom surface of load material with the perforating wheels respectively attached to the tips of the opposing clamps further comprises perforating the packaging along the bottom surface of the load material with the perforating wheel.

A twenty-fifth aspect may include the method of aspect twenty-four, further comprising in response to raising the clamshell bucket, tearing the packaging along a preformation formed by the perforating wheels.

A twenty-sixth aspect may include the method of any of aspects twenty-two to twenty-five, wherein closing the opposing clamps on the load material further comprises receiving, by a controller, a trigger to close the clamshell bucket, and in response to receipt of the trigger, causing, by the controller, a first hydraulic actuator to raise a longitudinal member attached to the clamshell bucket and a second hydraulic actuator to simultaneously close the clamps.

A twenty seventh aspect may include the method of any of aspects twenty-two to twenty six, further comprising: positioning a rear end of a vehicle adjacent to a load material, wherein a longitudinal member extends at least partially over the load material, wherein lowering the clamshell bucket comprises lowering the longitudinal member, and wherein raising the clamshell bucket comprises raising the longitudinal member.

A twenty-eighth aspect may include the method of aspect twenty-seven, wherein the vehicle comprises a motorized vehicle, a trailer, or a combination thereof.

What is claimed is:

1. A clamp assembly for processing load material, the clamp assembly comprising:
- an assembly body, and
- a pair of clamps pivotally coupled to the assembly body at a base of each clamp to receive a load material in a scoop space defined between the pair of clamps and beneath the assembly body, each clamp comprising
  - a scooping surface disposed between the assembly body and a tip of the respective clamp,
  - a retention plate coupled to a first end of the scooping surface, and
  - a cutting plate coupled to a second end of the scooping surface such that the scooping surface, the retention plate, and the cutting plate cooperate to further define the scoop space, wherein the cutting plate of each clamp includes a perforating edge extending continuously between the base and the tip of the respective clamp, and wherein the retention plate of each clamp is free of a perforating edge.

2. The clamp assembly of claim 1, wherein the pair of clamps is configured to move between an open position in which the pair of clamps pivot away from each other relative to the assembly body to expand the scoop space to position a first portion of the load material in the scoop space and a closed position in which the pair of clamps pivot toward each other relative to the assembly body to contract the scoop space and cut into a packaging of the load material with the perforating edge of each clamp so that the first portion of the load material is separable from a second portion of the load material.

3. The clamp assembly of claim 2, wherein the first portion of the load material is retained within the packaging surrounding the first portion of the load material while the second portion of the load material is retained within the packaging surrounding the second portion of the load material when the pair of clamps are in the closed position.

4. A clamp assembly for processing load material, the clamp assembly comprising:
- an assembly body, and
- a pair of clamps pivotally coupled to the assembly body at a base of each clamp to receive a load material in a scoop space defined between the pair of clamps and beneath the assembly body, each clamp comprising
  - a scooping surface disposed between the assembly body and a tip of the respective clamp,
  - a retention plate coupled to a first end of the scooping surface, and
- a cutting plate coupled to a second end of the scooping surface such that the scooping surface, the retention plate, and the cutting plate cooperate to further define the scoop space, wherein the cutting plate of each clamp includes a perforating edge extending continuously between the base and the tip of the respective clamp,
- wherein the pair of clamps is configured to move between an open position in which the pair of clamps pivot away from each other relative to the assembly body to expand the scoop space to position a first portion of the load material in the scoop space and a closed position in which the pair of clamps pivot toward each other relative to the assembly body to contract the scoop space and cut into a packaging of the load material with the perforating edge of each clamp so that the first portion of the load material is separable from a second portion of the load material, and
- wherein the perforating edge of a first clamp is spaced apart from the perforating edge of a second clamp when the pair of clamps is in both the open position and the closed position.

5. The clamp assembly of claim 2, wherein the retention plate of each clamp includes a retention edge disposed between the base and the tip of each respective clamp and being formed to include a recessed edge portion.

6. The clamp assembly of claim 5, wherein the recessed edge portion of a first clamp cooperates with the recessed edge portion of a second clamp to define a window between the first clamp and the second clamp to allow an operator of the clamp assembly to view at least a portion of the scoop space when the pair of clamps is in the closed position.

7. The clamp assembly of claim 1, wherein at least a portion of the cutting plate of each clamp is angled away such that a first distance between the cutting plate and the retention plate along the base of a respective clamp is greater than a second distance between the cutting plate and the retention plate along the tip of the respective clamp.

8. The clamp assembly of claim 7, wherein an angle between the cutting plate at the tip of a respective clamp and the cutting plate at the base of the respective clamp relative to the tip of the respective clamp is between about 5 degrees and about 7 degrees.

9. The clamp assembly of claim 2, wherein a cut edge of the second portion of the load material is sloped when the first portion of the load material is separated from the second portion of the load material by the clamp assembly.

10. The clamp assembly of claim 1, further comprising a first hydraulic actuator configured to pivot a first clamp and a second hydraulic actuator configured to pivot a second clamp, the first and second hydraulic actuators being coupled to the assembly body.

11. A clamshell bucket system for retaining and transporting load material, the clamshell bucket system comprising:
- a clamp assembly having an assembly body and a pair of clamps pivotally coupled to the assembly body at a base of each clamp to receive a load material resting on a ground surface in a scoop space defined between the pair of clamps and beneath the assembly body,
- a lift assembly coupled to the clamp assembly, the lift assembly including a hydraulic actuator configured to raise and lower the clamp assembly away and towards the ground surface, and
- a controller configured to cause the hydraulic actuator to change the clamp assembly between a first elevation in which a tip of each clamp is spaced a first height from the ground surface and a second elevation in which the tip of each clamp is spaced a second height from the ground surface, the second height being less than the first height, wherein when the clamp assembly is in the second elevation, the pair of clamps is configured to move between an open position in which the pair of clamps pivot away from each other relative to the assembly body to expand the scoop space to position the load material in the scoop space and a closed position in which the pair of clamps pivot toward each other relative to the assembly body to contract the scoop space to enclose the load material in the scoop space without the tip of each clamp touching the ground surface so that the amount of material from the ground surface collected with the load material is minimized, wherein each clamp includes a scooping surface disposed between the assembly body and the tip of the respective clamp, a retention plate coupled to a first end of the scooping surface, and a cutting plate coupled to a second end of the scooping surface such that the scooping surface, the retention plate, and the cutting plate cooperate to further define the scoop space, wherein the cutting plate of each clamp includes a perforating edge extending continuously between the base and the tip of the respective clamp, and wherein the retention plate of each clamp is free of a perforating edge.

12. The clamshell bucket system of claim 11, wherein the second elevation is about one inch or less away from the ground surface.

13. The clamshell bucket system of claim 11, wherein the perforating edge of a first clamp is spaced apart from the perforating edge of a second clamp when the pair of clamps is in both the open position and the closed position.

14. The clamshell bucket system of claim 11, wherein the retention plate of each clamp includes a retention edge disposed between the base and the tip of each respective clamp and being formed to include a recessed edge portion.

15. The clamshell bucket system of claim 14, wherein the recessed edge portion of the retention edge of a first clamp of a pair of clamps cooperates with the recessed edge portion of the retention edge of a second clamp to define a window between the first clamp and the second clamp to allow an operator of the clamp assembly to view at least a portion of the scoop space when the pair of clamps is in the closed position.

16. The clamshell bucket system of claim 11, wherein at least a portion of the cutting plate of each clamp is angled away such that a first distance between the cutting plate and the retention plate along the base of a respective clamp is greater than a second distance between the cutting plate and the retention plate along the tip of the respective clamp.

17. The clamshell bucket system of claim 16, wherein an angle between the cutting plate at the tip of a respective clamp and the cutting plate at the base of the respective clamp relative to the tip of the respective clamp is between about 5 degrees and about 7 degrees.

18. The clamshell bucket system of claim 11, wherein the clamp assembly further includes a first hydraulic actuator configured to pivot a first clamp and a second hydraulic actuator configured to pivot a second clamp, the first and second hydraulic actuators being coupled to the assembly body.

19. The clamp assembly of claim 1, wherein the assembly body includes a perforating edge that extends between the perforating edge on each of the pair of clamps.

20. The clamp assembly of claim 1, wherein the perforating edge of each of the pair of clamps includes a plurality of teeth.

* * * * *